(12) United States Patent
Hollmann et al.

(10) Patent No.: US 12,460,019 B2
(45) Date of Patent: Nov. 4, 2025

(54) PREPARATION OF REGENERATED POLYSACCHARIDES

(71) Applicant: Universität Rostock, Rostock (DE)

(72) Inventors: Dirk Hollmann, Bad Doberan (DE); Mai Ngoc Nguyen, Rostock (DE); Udo Kragl, Kritzmow (DE)

(73) Assignee: Universitaet Rostock, Rostock (DE)

( * ) Notice: Subject to any disclaimer, the term of this patent is extended or adjusted under 35 U.S.C. 154(b) by 645 days.

(21) Appl. No.: 17/788,399

(22) PCT Filed: Dec. 23, 2020

(86) PCT No.: PCT/EP2020/087783
§ 371 (c)(1),
(2) Date: Jun. 23, 2022

(87) PCT Pub. No.: WO2021/130323
PCT Pub. Date: Jul. 1, 2021

(65) Prior Publication Data
US 2023/0050320 A1    Feb. 16, 2023

(30) Foreign Application Priority Data

Dec. 23, 2019 (DE) .......................... 102019135776.4
Feb. 7, 2020 (DE) .......................... 102020103195.5

(51) Int. Cl.
*C08B 16/00* (2006.01)
(52) U.S. Cl.
CPC .................................. *C08B 16/00* (2013.01)
(58) Field of Classification Search
CPC .................................................... C08B 16/00
USPC ........................................................ 536/57
See application file for complete search history.

(56) References Cited

U.S. PATENT DOCUMENTS

| | | | |
|---|---|---|---|
| 4,474,951 | A | 10/1984 | Pope |
| 5,656,373 | A | 8/1997 | Scarpa et al. |
| 2014/0212670 | A1 | 7/2014 | Shimamoto et al. |
| 2015/0232582 | A1 | 8/2015 | Fallon et al. |
| 2016/0040360 | A1 | 2/2016 | Li et al. |

FOREIGN PATENT DOCUMENTS

| | | |
|---|---|---|
| JP | 2008050595 A | 3/2008 |
| JP | 2014144998 A | 8/2014 |
| JP | 2014162844 A | 9/2014 |
| JP | 2018100361 A | 6/2018 |
| WO | 2014031672 A2 | 2/2014 |
| WO | 2019180321 A1 | 9/2019 |

OTHER PUBLICATIONS

Bruel et al. The structural amphiphilicity of cellulose nanocrystals characterized from their cohesion parameters. Carbohydrate Polymers 205 (2019) 184-191. Available online Oct. 13, 2018 (Year: 2018).*
International Search Report for PCT/EP2020/087783, 2 pages, dated May 6, 2021.

* cited by examiner

*Primary Examiner* — Yih-Horng Shiao
(74) *Attorney, Agent, or Firm* — Viksnins Harris Padys Malen LLP

(57) ABSTRACT

The invention relates to method for preparing a high-purity regenerated polysaccharide by precipitating a dissolved polysaccharide due to a reaction of the solvent with an organic carbonate, which is much more health-friendly, environmentally friendly and safer than conventional methods. Materials from the produced regenerated polysaccharide are also provided.

16 Claims, 9 Drawing Sheets

PREPARATION OF REGENERATED POLYSACCHARIDES

CROSS-REFERENCE TO RELATED APPLICATION(S)

Figure 1:
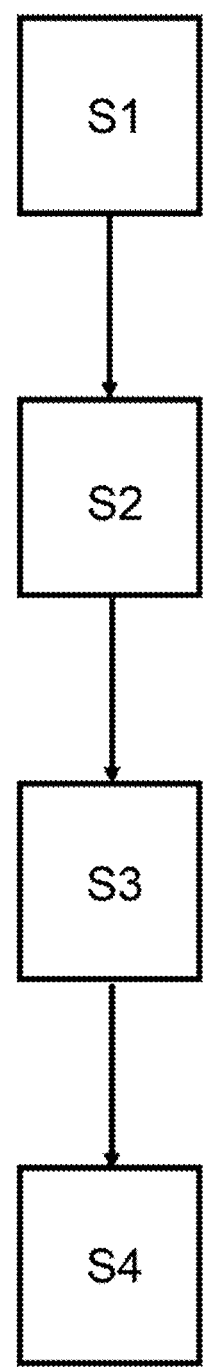

This patent application claims priority to German application serial No. 102019135776.4, filed Dec. 23, 2019; and German application serial No. 102020103195.5, filed Feb. 7, 2020, which applications are herein incorporated by reference.

The invention relates to a process for producing a regenerated polysaccharide, to a regenerated polysaccharide produced by the process, and to a product made from the regenerated polysaccharide.

Polysaccharides are carbohydrate polymers composed of at least eleven monosaccharides joined via a glycosidic bond. The most common polysaccharide in nature is cellulose. Cellulose is used as a raw material in the paper industry and in the construction, textile and chemical industries. In addition, cellulose and its derivatives have been used for decades in numerous sectors such as environmental technology, filtration and medical applications.

Cellulose is a biopolymer which is synthesized by plants. Natural crystalline cellulose, for processing or production of products, is frequently converted to synthetic regenerated cellulose. Regenerated cellulose is understood here to mean cellulose which has been dissolved and reprecipitated. This alters the crystal lattice of natural cellulose by swelling and dissolution processes, without any change in the molecular structure of the cellulose. This conversion is irreversible since regenerated cellulose is the most thermodynamically stable form of cellulose. In addition, cellulose can also be synthesized chemically.

Processing of cellulose for production of regenerated cellulose fibers and films has been dominated for more than a century by the viscose route (cellophane cellulose) and cuprammonium route (cuprophane cellulose). However, these processes are associated with considerable environmental pollution, which are accompanied by a number of economic problems. There is therefore a need for more environmentally friendly, simpler and energy-saving processes.

In the last few years, industrial and nonindustrial processes for the production of regenerated cellulose have been developed. Solvents used have included non-derivatizing solvents such as lithium chloride/dimethylacetamide (DMAc), N-methylmorpholine N-oxide (NMMO, Lyocell process), alkali/urea or thiourea. As well as ionic liquids, which do not tolerate water, water-containing solvent mixtures are also used, for example sodium hydroxide (NaOH) together with highly toxic carbon disulfide ($CS_2$). However, most solvents have disadvantageous properties such as high toxicity or high volatility and/or are costly. More advantageous by contrast are electrolyte solutions, for example of quaternary onium hydroxides such as tetrabutylammonium hydroxide (TBAH) or tetrabutylphosphonium hydroxide (TBPH), which have low toxicity and hence better environmental acceptability and enable unproblematic handling.

The standard method of producing membranes is via introduction of cellulose films into antisolvents or by evaporation of the solvent. Ammonium-based electrolytes such as TBAH can be used to produce cellulose films by "aging" (over a particular prolonged period of time) on a PTFE surface. These films cannot be detached on other surfaces (e.g. glass).

A process for producing regenerated cellulose by means of phosphonium-based electrolytes such as TBPH is disclosed in US 2014/0212670 A1. In this process, cellulose is precipitated in the form of flakes or fiber, film, pellets or particles by using solvents that are more volatile than the solvent used in the dissolution. This displaces water and TBPH. In practice, according to studies by the applicants, however, all that are formed are fine powders of regenerated cellulose. The problem addressed is that of developing a reliable process for providing regenerated polysaccharides in various forms and products.

This problem is solved by a process having the features according to claim 1. Further advantageous embodiments and configurations of the invention will be apparent from the subsidiary and dependent claims, the figures and the working examples. The embodiments of the invention can be combined with one another in an advantageous manner.

A first aspect of the invention relates to a process for producing a solid regenerated polysaccharide, comprising the steps of:

S1) providing a polysaccharide,
S2) dissolving the polysaccharide in at least one electrolytic solvent, wherein the electrolytic solvent used is a quaternary onium hydroxide in a content of about 40-80% by weight in water,
S3) precipitating the polysaccharide in gelated form by contacting the polysaccharide solution with an electrophilic reagent, the electrophilic reagent used being at least one organic carbonate, or a mixture of different organic carbonates, or at least one polymer of an organic carbonate, or a mixture of different polymers of organic carbonates, or a mixture of at least one organic carbonate and at least one polymer of an organic carbonate,
S4) washing the regenerated polysaccharide.

The term "regenerated polysaccharide" refers to a polysaccharide which has been dissolved and reprecipitated. This alters the crystal lattice of natural polysaccharide by swelling and dissolution processes, without any change in the molecular structure of the polysaccharide.

The term "gelated form" in the context of this invention is understood to mean a set form, also referred to as solidified form. In the process of the invention, a solid is formed in step S3.

In the process of the invention, an electrophilic reagent is advantageously used for precipitation. However, this does not involve exchanging the solvent (as effected as standard in the industrial processes or in US 2014/212 670 A1); instead, the polysaccharide is precipitated directly by a reaction of the electrophilic reagent with the hydroxide ions of the solvent. When the polysaccharide is dissolved, hydrogen bonds are formed between the polysaccharide and the ions $[TBP]^+$ and $[OH]^-$ in the case of use of TBPH as solvent, which are parted again on contact with the electrophilic reagent by reaction with the hydroxide groups. There is no reaction of the reagent with the polysaccharide. The process advantageously enables simple production, within seconds, of powders and films without use of toxic chemicals. This means that the process is economically viable in terms of time and materials, and additionally environmentally friendly. The regenerated polysaccharides produced by the process are of high purity. This means that a simple and rapidly executed process is provided, in which nontoxic, recyclable and water-tolerant chemicals are used in order to produce regenerated polysaccharides.

The polysaccharides to be regenerated may be provided in microcrystalline form, but also in any other form, for example in synthetic or amorphous form or produced from biomass.

The polysaccharide may, for example, be cellulose, starch, chitin, chitosan or glycogen.

The polysaccharide used in the process is more preferably cellulose. Cellulose and its derivatives can be used in various ways. The process advantageously enables production of regenerated cellulose of high quality. Films produced by the process show extremely high homogeneity within the film and at the surface, which is very smooth. Both indicate uniform rapid penetration of the dissolved cellulose by the organic carbonate.

The cellulose to be regenerated may be provided in microcrystalline form, but also in any other form of cellulose, for example in synthetic or amorphous form or produced from biomass.

The electrolytic solvent used in the process is a quaternary onium hydroxide in a content of about 40-80% by weight (percent by weight) in water. Preference is given here to using at least a phosphonium-containing and/or an ammonium-containing onium hydroxide. Particular preference is given here to using TBPH. It is also possible to use TBAH, in which case the amount of the dissolved polysaccharide is smaller and the dissolving takes longer than in the case of TBPH.

The quaternary onium hydroxide may, for example, be a quaternary onium hydroxide as described in US 2014/212 670 A1.

The quaternary onium hydroxide may, for example, be a tetraalkylphosphonium hydroxide, the alkyl components of which have 2 to 8 carbon atoms, for example tetraethylphosphonium hydroxide, tetrapropylphosphonium hydroxide, tetrabutylphosphonium hydroxide, tetrapentylphosphonium hydroxide or tetrahexylphosphonium hydroxide. The quaternary onium hydroxide may, for example, be tetraphenylphosphonium hydroxide. The quaternary onium hydroxide may, for example, be a substituted or unsubstituted alkyltriphenylphosphonium hydroxide, for example ethyltriphenylphosphonium hydroxide, butyltriphenylphosphonium hydroxide, pentyltriphenylphosphonium hydroxide, 2-dimethylaminoethyltriphenylphosphonium hydroxide or methoxymethyltriphenylphosphonium hydroxide.

The quaternary onium hydroxide may, for example, be a tetraalkylammonium hydroxide, the alkyl components of which have 2 to 6 carbon atoms, for example tetraethylammonium hydroxide, tetrapropylammonium hydroxide, tetrabutylammonium hydroxide or tetrapentylammonium hydroxide.

The quaternary onium hydroxide is used, for example, in a content of 50% by weight in water.

The polysaccharide may have, for example, a proportion of 20% by weight in the solution.

The polysaccharide can be dissolved, for example, by stirring the polysaccharide solution, for example at room temperature (23° C.) for about 30 min.

Preference is given to using an additional solvent in step S2. Said solvent can thus be used in addition to the at least one electrolytic solvent. The additional solvent may be added here prior to the dissolution of the polysaccharide, simultaneously with the electrolytic solvent or after the dissolving of the polysaccharide. The ratio of the additional solvent to the electrolytic solvent may, for example, be 1:1. Particular preference is given to using dimethyl sulfoxide (DMSO) as additional solvent. The addition of DMSO reduces the viscosity of the regenerated polysaccharide solution and improves the coatability of the polysaccharide solution in the production of films. Coagulation is also accelerated. The films produced using DMSO are more flexible than without DMSO and additionally transparent.

In the process, the electrophilic reagent used is (i) at least one organic carbonate, or (ii) a mixture of different organic carbonates, or (iii) at least one polymer of an organic carbonate, or (iv) a mixture of different polymers of organic carbonates, or (v) a mixture of at least one organic carbonate and at least one polymer of an organic carbonate. Organic carbonates are particularly effective in the context of the invention. Organic carbonates result in immediate solidification of the polysaccharide solution without destroying the overall structure. When the polysaccharide solution comes into contact with the organic carbonate, there is a chemical reaction between the hydroxide anion of the solvent and the organic carbonate with release of a diol and of carbon dioxide, which is partly dissolved in the form of carbonate. The solvent and the diol can theoretically be recycled and recovered in subsequent steps. There is no reaction with the polysaccharide. A regenerated polysaccharide is formed.

The organic carbonate may, for example, be propylene carbonate, vinylethylene carbonate, butyl carbonate or ethylene carbonate.

The organic carbonate may be a cyclic or acyclic organic carbonate. The cyclic organic carbonate may, for example, be propylene carbonate, vinylethylene carbonate, butyl carbonate, ethylene carbonate or vinyl carbonate. The acyclic organic carbonate may, for example, be dimethyl carbonate, diethyl carbonate, dibutyl carbonate, dipropyl carbonate, dibenzyl carbonate, diphenyl carbonate or tert-butyl phenyl carbonate.

The organic carbonate used in the process is preferably propylene carbonate. Propylene carbonate is particularly advantageous because it is a carbonate which is liquid at room temperature and is producible sustainably from biomass and is therefore easy to use. Propylene carbonate is additionally cheap.

The polymer of an organic carbonate may have, for example, 2-1 000 000 monomers.

The polymer of an organic carbonate may, for example, be polypropylene carbonate.

The mixture of at least one organic carbonate and at least one polymer of an organic carbonate may, for example, be a mixture of propylene carbonate and polypropylene carbonate.

Solid organic carbonates are preferably dissolved before being used in the process, for example in DMSO. DMSO is particularly suitable here. This is also true of the polymers of organic carbonates. The polymers are solid at room temperature.

Preference is given to using at least one organic carbonate or a mixture of different organic carbonates in the process.

The electrophilic reagent is used in step S3 in a concentration of 10-100%, especially in a concentration of 80-100%. Step S3 is preferably conducted at a temperature in the range of 0-100° C. for 0.01-100 hours, especially preferably at 23° C. for 0.01-10 min, further preferably at 23° C. for 0.01-6 min. This means that the process works advantageously at room temperature. The process is additionally very rapid.

The purification of the regenerated polysaccharide that takes place in step S4, which is preferably effected with water, enables the effective removal of impurities, especially of water-soluble impurities, and of organic compounds formed (propylene glycol) and of solvent. This advantageously achieves a particularly high purity and a very uniform homogeneous structure of the regenerated polysaccharide.

In a preferred embodiment of the process, the regenerated polysaccharide is produced as a film (also referred to as foil) by coating the polysaccharide solution after step S2, in an additional step S2a, on a surface with a coating medium of defined height, for example a doctor blade. This affords a polysaccharide-solvent layer with a defined uniform layer thickness. After contact with the organic carbonate, for example propylene carbonate in step S3, for example by immersion into a propylene carbonate bath, the layer is converted to a film. This affords nontransparent whitish films. As described above, transparent films can be produced by addition of DMSO.

It has been shown that the films produced by means of the process have a surface potential (zeta potential) within a range of pH 5.0-9.0 of −20 mV on average.

The introduction of the electrophilic reagent and the leaching of solvent out of the polysaccharide solution result in formation of a permeable (porous) microfibrilated structure in films of regenerated polysaccharide produced by the process. It has been found that the properties of these films are comparable to conventionally produced membranes.

The films may be stored in neutral, slightly basic or slightly acidic media. It has been found that the print stability of the films is maintained in the course of such storage. For this purpose, the print stability of the films between 1 and 3 bar was checked in a flow reactor.

The films may be stored, for example, in water, ethanol or acetone. The films are preferably stored in water.

In a further preferred embodiment of the process, the regenerated polysaccharide is produced in pelletized form by mechanically comminuting it after step S4 in an additional step S4a. By comminuting the solids composed of regenerated polysaccharide that result after contacting of the polysaccharide solution with the organic carbonate, for example propylene carbonate, with subsequent washing procedure, it is possible to obtain highly pure polysaccharide material in pellet form, for example in powder form.

A second aspect of the invention relates to a regenerated polysaccharide that has been produced by the process of the invention according to the above-described embodiments. The regenerated polysaccharide is preferably regenerated cellulose.

The regenerated polysaccharide is preferably provided as a film. Preference is given to providing a film of regenerated cellulose. The films show high homogeneity within the film and at the surface. The surface is very smooth. The distances (pores) between the fibrils (fibers) are very small, preferably 10-100 nm, and are correspondingly selective for particular particle sizes. The films of the invention may be utilized, for example, as films or as membranes for the selective purification of drinking water. In addition, it is possible to selectively separate negatively charged ions from positively charged ions. In addition, the films may be used for production of plies and nanotubes.

Likewise preferably, the regenerated polysaccharide is provided in pellet form. Pellets, for example in powder form, may be used, for example, as additive in nutritional or medical preparations, in the construction chemicals industry or in ceramic applications.

The films and pellets of regenerated cellulose that are produced in accordance with the invention were characterized by methods such as Fourier transform infrared spectroscopy, nuclear magnetic resonance spectroscopy, x-ray diffraction, thermal analysis, atomic force microscopy, scanning electron microscopy, transmission electron microscopy, UV/VIS spectroscopy and size exclusion chromatography.

A third aspect of the invention relates to a product composed of a polysaccharide regenerated in accordance with the invention. Said products are, for example, membranes, films, plies or nanotubes, or combinations with other materials.

The advantages of the regenerated polysaccharide produced by the process and of the product composed of the regenerated polysaccharide correspond to the advantages of the process, to the extent that they are not restricted to purely a process technology aspect.

The following points are disclosed:
1. A process for producing a solid regenerated polysaccharide, comprising the steps of:
   S1) providing a polysaccharide,
   S2) dissolving the polysaccharide in at least one electrolytic solvent,
   S3) precipitating the polysaccharide in gelated form by contacting the polysaccharide solution with an electrophilic reagent having the formula

or the formula

or with a mixture of electrophilic reagents having the formulae I and/or II,
where X is a C=O, C=S, C=NR functionality and Y and Z are the same or different and are selected independently of one another and consist of O, NH, NR, S, CR groups, where R is hydrogen and/or a substituted or unsubstituted hydrocarbyl radical, and M is a bridge consisting of 0-20 carbon atoms and linear or branched, substituted or unsubstituted hydrocarbyl radicals,
   S4) washing the regenerated polysaccharide.
2. The process according to point 1, wherein the polysaccharide used is cellulose.
3. The process according to point 1 or 2, wherein the electrolytic solvent used is a quaternary onium hydroxide in a content of about 40-80% by weight in water.
4. The process according to point 3, wherein at least one phosphonium-containing and/or at least one ammonium-containing onium hydroxide is used.
5. The process according to point 4, wherein tetrabutylphosphonium hydroxide is used.
6. The process according to any of the preceding points, wherein an additional solvent is used in step S2.
7 The process according to point 6, wherein dimethyl sulfoxide is used as additional solvent.
8. The process according to any of the preceding points, wherein the electrophilic reagent is used in a concentration of 80-100%.
9. The process according to any of the preceding points, wherein the electrophilic reagent used in step S3 is at least one organic carbonate or a mixture of different organic carbonates.

10. The process according to point 9, wherein the organic carbonate used in step S3 is propylene carbonate.
11. The process according to any of points 1-8, wherein the electrophilic reagent used in step S3 is at least one polymer of an organic carbonate or a mixture of different polymers of organic carbonates or a mixture of at least one organic carbonate and at least one polymer of an organic carbonate.
12. The process according to any of the preceding points, wherein the regenerated polysaccharide is produced as a film by coating the polysaccharide solution after step S2 on a surface in an additional step S2a.
13. The process according to any of points 1-12, wherein the regenerated polysaccharide is produced in powder or pelletized form by mechanically comminuting it after step S4 in an additional step S4a.
14. A regenerated polysaccharide produced by a process according to any of points 1-13.
15. The regenerated polysaccharide according to point 14, provided in film form.
16. The regenerated polysaccharide according to point 14, provided in pellet form.
17. A product made from a regenerated polysaccharide according to any of points 14-16.

The features and examples described for the process of the invention for producing a regenerated polysaccharide, the regenerated polysaccharide of the invention produced by the process, and the product of the invention made from the regenerated polysaccharide are equally applicable to the corresponding features of the points disclosed, unless stated otherwise.

The substituted or unsubstituted hydrocarbyl radical covered by R is especially an alkyl or aryl radical, for example an alkyl radical having 1 to 20 carbon atoms or having 1 to 8 carbon atoms. R is preferably a methyl, ethyl or n-propyl radical.

Explicitly excluded for use as electrophilic reagents are compounds that were disclosed in publication US 2014/212 670 A1 for precipitation of regenerated cellulose. This relates particularly to alcohols having one to four carbon atoms, e.g. methanol, ethanol and 2-propanol, and ketones such as acetone. In other words, the use of these compounds is excluded from the scope of disclosure of point 1.

An "electrolytic solvent" is understood in the context of this disclosure to mean a dissolved solid composed of ion crystals consisting of hydroxide ions as negatively charged anions and positively charged cations. The electrolytic solvent used in the process disclosed is preferably a quaternary onium hydroxide in a content of about 40-80% by weight (percent by weight) in water. In addition, it is also possible that other protic and aprotic solvents are tolerated, which can lead to an improvement in flowability and hence processibility.

Also disclosed are the following points:
1. A process for producing a solid regenerated polysaccharide, comprising the steps of:
   S1) providing a polysaccharide,
   S2) dissolving the polysaccharide in at least one electrolytic solvent,
   S3) precipitating the polysaccharide in gelated form by contacting the polysaccharide solution with an electrophilic reagent, wherein the electrophilic reagent used is at least one reagent having the formula

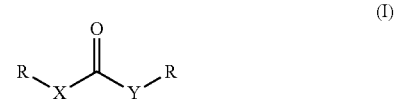

where X and Y is an O, S or NR functionality and X and Y are the same or different and are selected independently of one another, where R is hydrogen and/or a linear or branched, substituted or unsubstituted hydrocarbyl radical,
or at least one reagent having the formula

where X and Y is an O, S or NR functionality and X and Y are the same or different and are selected independently of one another, where R is hydrogen and/or a linear or branched, substituted or unsubstituted hydrocarbyl radical, and B is a bridge consisting of a linear or branched, substituted or unsubstituted hydrocarbyl radical having 1-20 carbon atoms,
or a mixture of reagents having the formula I and/or II,
or at least one polymer having 2-1 000 000 monomers, where the monomers correspond to reagents having the formula I and/or the formula II,
or a mixture of polymers each having 2-1 000 000 monomers, where the monomers correspond to reagents having the formula I and/or the formula II,
or a mixture of at least one reagent having the formula I and/or the formula II and at least one polymer having 2-1 000 000 monomers, where the monomers correspond to reagents having the formula I and/or the formula II,
   S4) washing the regenerated polysaccharide.
2. The process according to point 1, wherein the polysaccharide used is cellulose.
3. The process according to point 1 or 2, wherein the electrolytic solvent used is a quaternary onium hydroxide in a content of about 40-80% by weight in water.
4. The process according to point 3, wherein at least one phosphonium-containing and/or at least one ammonium-containing onium hydroxide is used.
5. The process according to point 4, wherein tetrabutylphosphonium hydroxide is used.
6. The process according to any of the preceding points, wherein an additional solvent is used in step S2.
7. The process according to point 6, wherein dimethyl sulfoxide is used as additional solvent.
8. The process according to any of the preceding points, wherein the electrophilic reagent is used in a concentration of 80-100%.
9. The process according to any of the preceding points, wherein the electrophilic reagent used in step S3 is at least one organic carbonate, or a mixture of different organic carbonates, or at least one polymer of an organic carbonate, or a mixture of different polymers of organic carbonates, or a mixture of at least one organic carbonate and at least one polymer of an organic carbonate.

10. The process according to point 9, wherein an organic carbonate is used in step S3.

11. The process according to point 10, wherein the organic carbonate used in step S3 is propylene carbonate.

12. The process according to any of the preceding points, wherein the regenerated polysaccharide is produced as a film by coating the polysaccharide solution after step S2 on a surface in an additional step S2a.

13. The process as claimed in any of points 1-12, wherein the regenerated polysaccharide is produced in powder or pelletized form by mechanically comminuting it after step S4 in an additional step S4a.

14. A regenerated polysaccharide produced by a process according to any of points 1-13.

15. The regenerated polysaccharide according to point 14, provided in film form.

16. The regenerated polysaccharide according to point 14, provided in pellet form.

17. A product made from a regenerated polysaccharide according to any of points 14-16.

The features and examples described for the process of the invention for producing a regenerated polysaccharide, the regenerated polysaccharide of the invention produced by the process, and the product of the invention made from the regenerated polysaccharide are equally applicable to the corresponding features of the points disclosed, unless stated otherwise.

The substituted or unsubstituted hydrocarbyl radical covered by R is especially an alkyl or aryl radical, for example an alkyl radical having 1 to 20 carbon atoms or having 1 to 8 carbon atoms. R is preferably a methyl, ethyl or n-propyl radical.

Explicitly excluded for use as electrophilic reagents are compounds that were disclosed in publication US 2014/212 670 A1 for precipitation of regenerated cellulose. This relates particularly to alcohols having one to four carbon atoms, e.g. methanol, ethanol and 2-propanol, and ketones such as acetone. In other words, the use of these compounds is excluded from the scope of disclosure of point 1.

An "electrolytic solvent" is understood in the context of this disclosure to mean a dissolved solid composed of ion crystals consisting of hydroxide ions as negatively charged anions and positively charged cations. The electrolytic solvent used in the process disclosed is preferably a quaternary onium hydroxide in a content of about 40-80% by weight (percent by weight) in water. In addition, it is also possible that other protic and aprotic solvents are tolerated, which can lead to an improvement in flowability and hence processibility.

The invention is elucidated in detail by the figures. The figures show:

FIG. 1 a flow diagram of a general embodiment of the process of the invention for producing regenerated cellulose.

Figure 2:
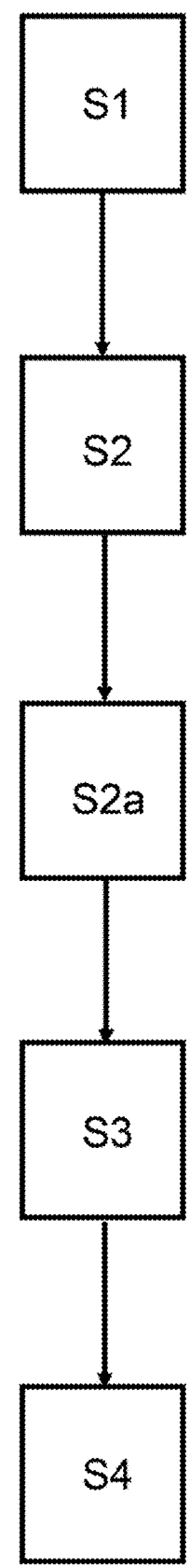

FIG. 2 a flow diagram of a further embodiment of the process of the invention for producing a film.

Figure 3:
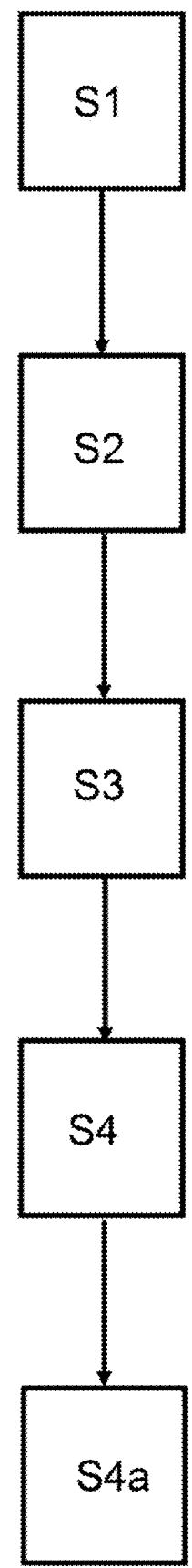

FIG. 3 a flow diagram of an embodiment of the process of the invention for producing a pelletized material.

Figure 4:
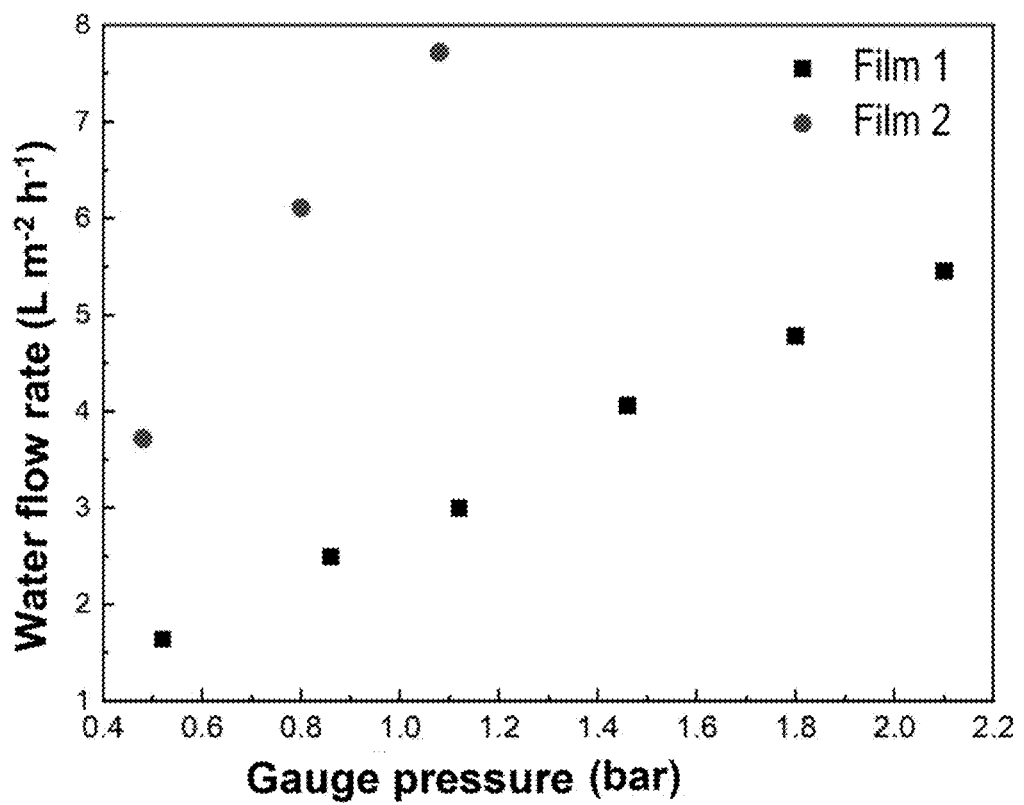

FIG. 4 a diagram for analysis of the permeability of the regenerated cellulose film produced according to FIG. 2.

Figure 5:
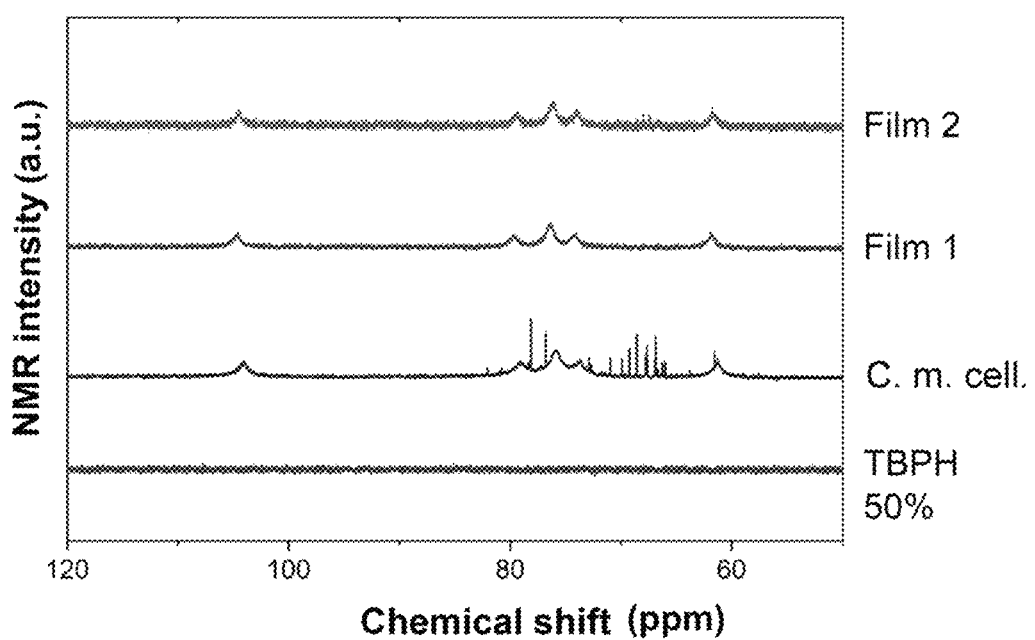

FIG. 5 a diagram ($^{13}$C nuclear magnetic resonance spectroscopy analysis) for analysis of the quality and structure of the regenerated cellulose of the film produced according to FIG. 2. C.m. cell.—commercial microcrystalline cellulose.

Figure 6:
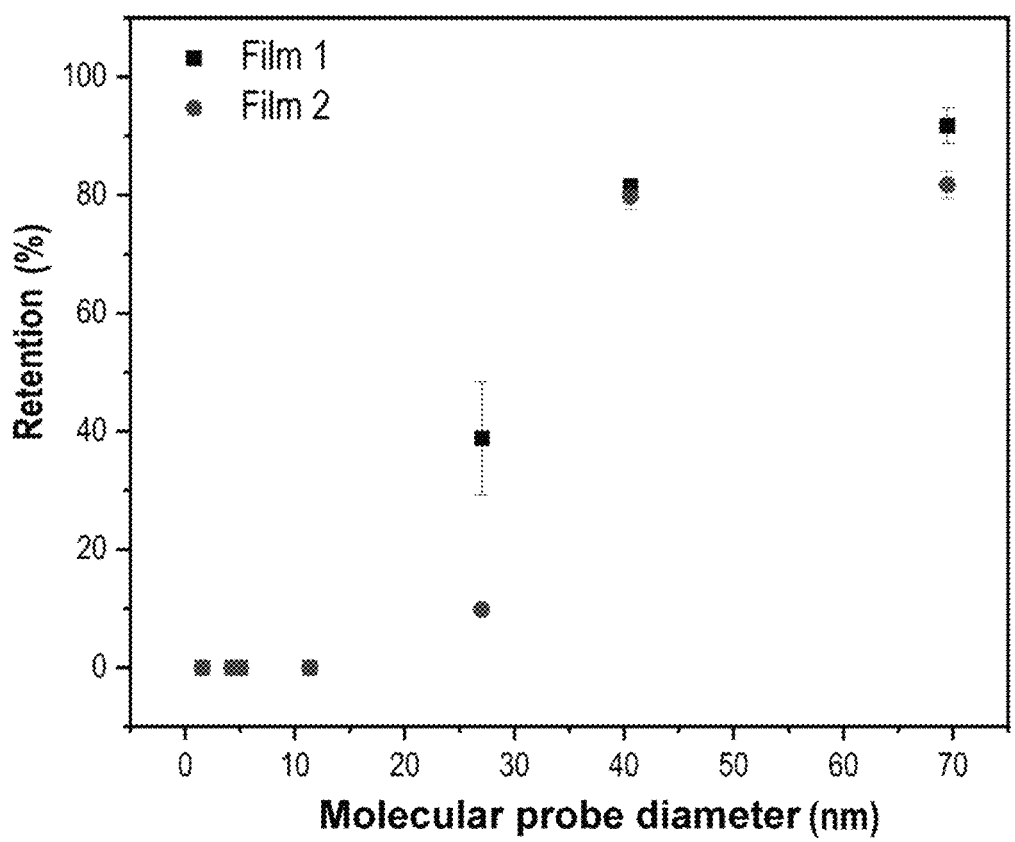

FIG. 6 diagrams for analysis of pore size of the regenerated cellulose film produced according to FIG. 2.

Figure 7:
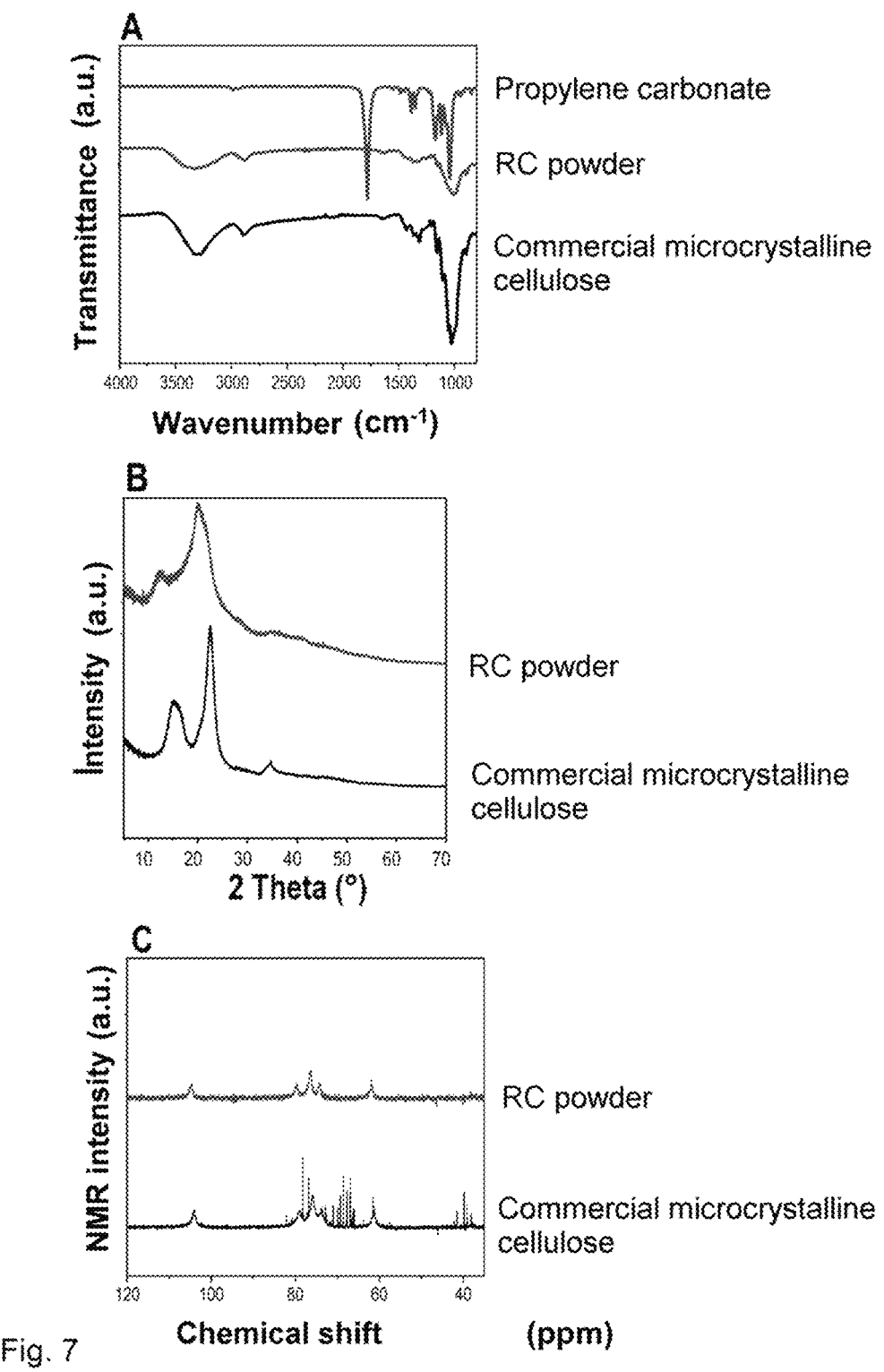

FIG. 7 diagrams for analysis of the structure of the regenerated cellulose of the pelletized material produced according to FIG. 3 by means of A) FT-IR spectroscopy, B) x-ray diffraction and C) nuclear magnetic resonance spectroscopy.

Figure 8:
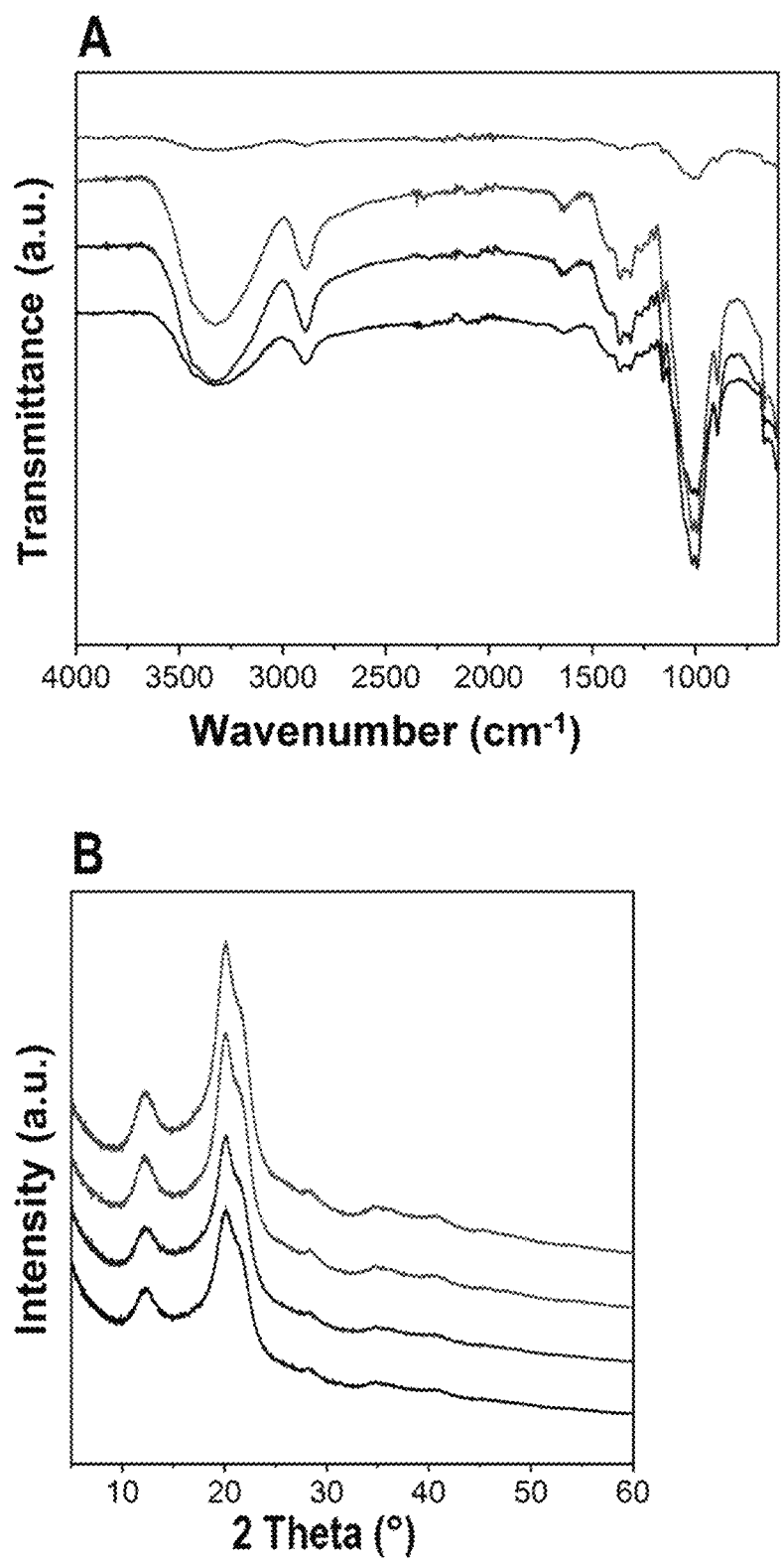

FIG. 8 diagrams for comparative analysis of the structure of the regenerated cellulose of pellets produced using four different organic carbonates according to FIG. 3 by means of A) FT-IR and B) x-ray diffraction.

Figure 9:
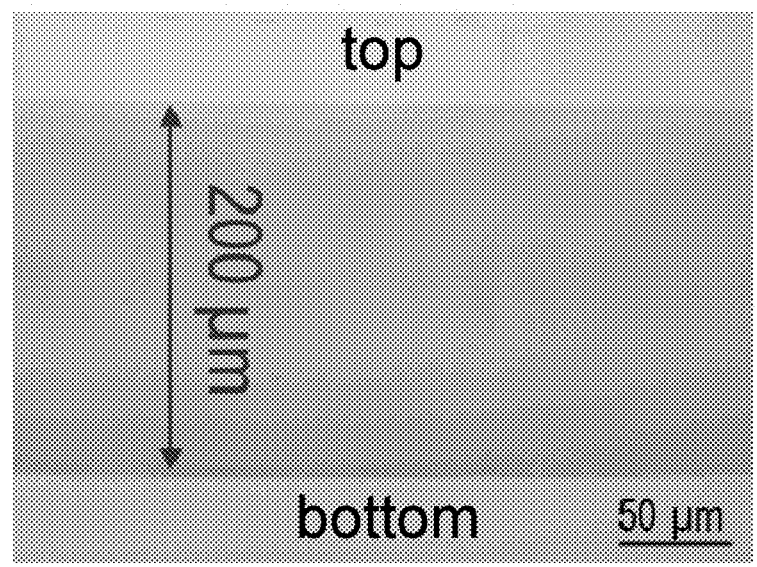

FIG. 9 a light micrograph of a cross section of a regenerated cellulose film produced according to FIG. 2.

Figure 10:
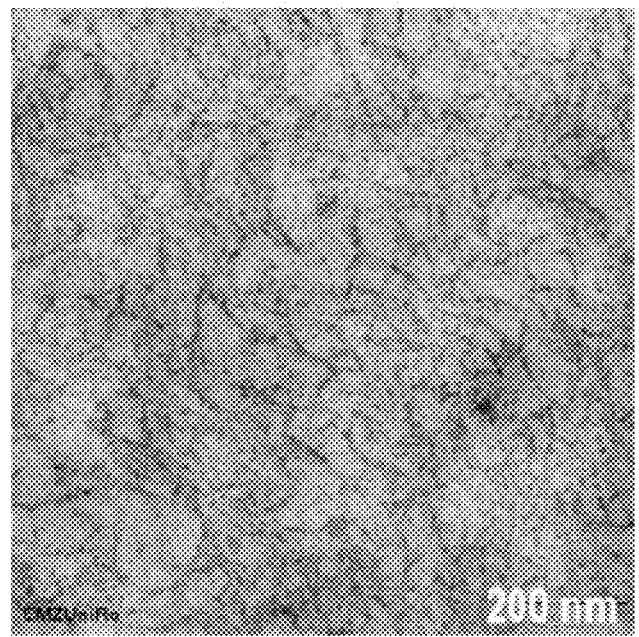

FIG. 10 a transmission electron micrograph of a cross section of a regenerated cellulose film produced according to FIG. 2.

In a general embodiment of the process of the invention according to FIG. 1, regenerated cellulose is produced. For this purpose, in a first step S1, natural cellulose is provided in microcrystalline form. Alternatively, however, the cellulose may also be provided in any other possible form of cellulose, for example in synthetic or amorphous form or produced from biomass. In a second step S2, in a suitable vessel, 20 percent by weight (% by weight) (200 mg) of the microcrystalline cellulose is dissolved in a 50% aqueous solution of TBPH (1 ml). This involves stirring the resultant cellulose solution at room temperature (23° C.) for about 30 min. In a third step S3, the liquid is admixed with propylene carbonate for coagulation. This immediately converts the cellulose-solvent layer to regenerated cellulose. In a fourth step S4, the regenerated cellulose is washed with water in order to remove solvent and organic compounds formed. High-purity regenerated cellulose is obtained.

In one embodiment of the process of the invention for producing regenerated cellulose films/foils according to FIG. 2, the process is executed analogously to FIG. 1 except that, in an additional step S2a, the clear solution is coated, for example by means of a doctor blade, on the glass plate. This affords a particular preset thickness of the cellulose-solvent layer (e.g. 300 μm). In a third step S3, the cast liquid is immersed into a propylene carbonate bath for coagulation. This immediately converts the cellulose-solvent layer to a film of regenerated cellulose. In a fourth step S4, the regenerated cellulose films were washed with water in order to remove solvents and organic compounds formed and to obtain a high-purity cellulose film. There was immediate detachment from the glass plate. The films are stored in water until use.

However, there is no change in the optical properties in this conversion; the cellulose films are whitish and nontransparent, and so the conversion of the cellulose-solvent layer to a cellulose film cannot be perceived visually. In a further embodiment of the process of the invention, in step S2, DMSO (preferred ratio of solvent:DMSO 1:1) is added as an additional solvent to the dissolved cellulose. This produces a transparent cellulose film in step S3. The conversion likewise cannot be recognized visually. The use of DMSO also influences the permeability of the films, as can be shown by a water flow test in films used as membranes according to FIG. 4. The water flow rate depends in principle on the size and distribution of pores in the membrane. A first membrane was produced here without DMSO (RC1), and a second membrane with DMSO (RC2). In the first film RC1, there was an increase in water permeability in a pressure-dependent manner from 1.6 to 5.4 $L*m^{-2}*h^{-1}$ within a pressure range of 0.5 to 2.1 bar (square data points). In the second film RC2, there was an increase in water permeability in a pressure-dependent manner from 3.7 to 7.8 $L*m^{-2}*h^{-1}$ in a pressure range of 0.5 to 1.1 bar (round data points). The greater permeability that can be seen shows an obvious diluting effect of the DMSO on the regenerated cellulose.

FIG. 5 illustrates the purifying effect of the novel process and the improved quality of the films produced. The abbreviation a.u. stands for arbitrary units. The impurities (sharp signals) are not present in the films. In addition, the chemical structure of the membranes RC2 (film 2, uppermost graph) and RC1 (film 1, second graph from the top) corresponds to that of commercial microcrystalline cellulose (abbreviated to C.m. cell., second graph from the bottom). The lowermost graph relates to the solvent (TBPH, 50%).

FIG. 6 shows the pore distribution of two films. The pores have a size of 10-70 nm and are thus much smaller than those of commercially available regenerated cellulose membranes (200-500 nm).

In a further embodiment of the process of the invention according to FIG. 3, a pelletized material is produced from regenerated cellulose. Steps S1 and S2 are executed here as in the process described according to FIG. 1. Propylene carbonate is added directly to the cellulose solution in step S3 (preferably a 10:1 excess of propylene carbonate). There is immediate gelation/solidification of the regenerated cellulose. The solidified regenerated cellulose can be washed with water in step S4, for example by repeated decanting of the supernatant or centrifuging, once the cellulose has settled out at the base of the vessel containing the cellulose and the solvent. The regenerated cellulose is preferably dried at 30-100° C. and stored in pellet form until further use. The pellet material may optionally be mechanically comminuted in step S4a, for example by means of a pestle or a mortar. The size of the pellet particles formed in the process described for FIG. 3 may be varied, such that a powder or a coarser pellet material can be produced. The size of the pellet material can be adjusted via appropriate comminution equipment and the intensity of comminution (force applied, duration of application).

The pellet material produced was examined structurally. It has been shown that the regenerated cellulose was not chemically modified by the propylene carbonate, i.e. that there is indeed no chemical reaction of the cellulose with the propylene carbonate here. Analysis by Fourier transformation infrared spectroscopy (FT-IR) shows that no propylene carbonate has been incorporated into the cellulose structure (FIG. 7A). The upper line here indicates propylene carbonate, the middle line the regenerated cellulose, and the lower line natural microcrystalline cellulose. The dissolved cellulose is thus regenerated without changes in the chemical structure. Analysis of the pelletized material by x-ray diffraction (XRD) shows that a transformation of the macroscopic structure has occurred. New occurrence of reflections at 12.1° and 20.6° in the upper graph (regenerated cellulose) compared to the lower graph (natural cellulose, crystalline cellulose) indicate the formation of the cellulose II structure (regenerated cellulose) (FIG. 7B). Analysis by nuclear magnetic resonance (NMR) also showed no changes in the chemical structure, as apparent from the similar progression of the upper graph (regenerated cellulose) compared to the lower graph (natural cellulose) (FIG. 7C). The abbreviation a.u. in each case stands for arbitrary units.

As an alternative to the propylene carbonate used, it is also possible to use other organic carbonates in order to obtain regenerated cellulose (FIG. 8). By means of FT-IR (FIG. 8A) and x-ray diffraction (FIG. 8B), it was shown that vinylethylene carbonate (uppermost graph), butyl carbonate (second graph from the top) and ethylene carbonate (second graph from the bottom) afford regenerated cellulose with the same structure as with propylene carbonate (lowermost graph). The abbreviation a.u. in each case stands for arbitrary units.

FIG. 9 shows a light micrograph of a cross section of a film of regenerated cellulose produced according to FIG. 2. The image shows a film (foil) that has been produced without DMSO as additional solvent (RC1). The thickness of the film is 200 µm. The image shows excellent homogeneity within the film. The image additionally shows that the film does not have any air bubbles.

FIG. 10 shows a high-resolution transmission electron micrograph (TEM image) of a cross section of a film of regenerated cellulose produced according to FIG. 2. The image shows a film (foil) that has been produced without DMSO as additional solvent (RC1). The microfibrillar structure has been visualized by means of uranyl acetate and lead citrate.

The materials made of regenerated cellulose produced may find use in filter technology. For example, the films produced may be used as membranes for the selective purification of drinking water.

The invention claimed is:

1. A process for producing a solid regenerated polysaccharide, comprising the steps of:
    S1) providing a polysaccharide,
    S2) dissolving the polysaccharide in at least one electrolytic solvent, wherein the electrolytic solvent is a quaternary onium hydroxide in a content of about 40-80% by weight in water to produce a polysaccharide solution,
    S3) precipitating the polysaccharide in gelated form by contacting the polysaccharide solution with a suitable concentration of an electrophilic reagent, wherein the electrophilic reagent is at least one cyclic organic carbonate, or at least one polymer of a cyclic organic carbonate to obtain a regenerated polysaccharide, and
    S4) washing the regenerated polysaccharide.

2. The process as claimed in claim 1, wherein the polysaccharide is cellulose.

3. The process as claimed in claim 1, wherein the quaternary onium hydroxide is at least one phosphonium-containing and/or at least one ammonium-containing onium hydroxide.

4. The process as claimed in claim 3, wherein the quaternary onium hydroxide is tetrabutylphosphonium hydroxide.

5. The process as claimed in claim 1, wherein an additional solvent is used in step S2.

6. The process as claimed in claim 5, wherein the additional solvent is dimethyl sulfoxide.

7. The process as claimed in claim 1, wherein the electrophilic reagent is in a concentration of 80-100% by weight.

8. The process as claimed in claim 1, wherein the cyclic organic carbonate is propylene carbonate.

9. The process as claimed in claim 1, wherein the regenerated polysaccharide in step S3 is produced as a film by coating the polysaccharide solution after step S2 on a surface in an additional step S2a.

10. The process as claimed in claim 1, wherein the regenerated polysaccharide In step S4 is processed in an additional step S4a to powder or pelletized form by mechanically comminuting.

11. A regenerated polysaccharide produced by a process as claimed in claim 1.

12. A regenerated polysaccharide produced in film form as claimed in claim 9.

13. A regenerated polysaccharide produced in pellet form as claimed in claim 10.

14. A product made from a regenerated polysaccharide as claimed in claim 11.

15. A product made from a regenerated polysaccharide as claimed in claim 12.

16. A product made from a regenerated polysaccharide as claimed in claim 13.

* * * * *